United States Patent
Rajendran et al.

(10) Patent No.: US 10,383,130 B2
(45) Date of Patent: Aug. 13, 2019

(54) ALLOCATION OF RADIO ALTIMETER (RA) SUB-BANDS TO WIRELESS AVIONICS INTRA-COMMUNICATION SYSTEMS

(71) Applicant: Wipro Limited, Bangalore (IN)

(72) Inventors: Surendran Rajendran, Chennai (IN); Ramachandra Budihal, Bangalore (IN); Venkata Prabhakar Tamma, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/374,381

(22) Filed: Dec. 9, 2016

(65) Prior Publication Data
US 2018/0124795 A1    May 3, 2018

(30) Foreign Application Priority Data
Oct. 28, 2016 (IN) .............................. 201641037175

(51) Int. Cl.
*H04W 72/08* (2009.01)
*H04W 16/14* (2009.01)
*H04W 72/04* (2009.01)
*G08C 17/02* (2006.01)

(52) U.S. Cl.
CPC .......... *H04W 72/082* (2013.01); *G08C 17/02* (2013.01); *H04W 16/14* (2013.01); *H04W 72/0446* (2013.01); *H04W 72/0453* (2013.01)

(58) Field of Classification Search
CPC ...... G08G 5/0021; G08G 5/025; G01C 5/005; H04B 7/18506; H04W 72/0446
USPC .................................................. 455/431, 454
See application file for complete search history.

(56) References Cited

U.S. PATENT DOCUMENTS

| | | | |
|---|---|---|---|
| 2016/0277161 A1 | 9/2016 | Haque et al. | |
| 2017/0230916 A1* | 8/2017 | Stein | H04W 52/34 |
| 2017/0247112 A1* | 8/2017 | Horner | B64D 13/04 |

OTHER PUBLICATIONS

"Aeronautical Communications Panel (ACP) Twenty Ninth Meeting of Working Group F", Working Paper, 12-SEP-20163, pp. 1-33.
Meyefhoff et al., "Interference Impact of Wireless Avionics Intra-Communication Systems Onto Aeronautical Radio Altimeters", Feb. 2, 2015, pp. 1-6, VDE Verlag GmbH, Berlin, Germany.
"Striving for a Safer World Since 1945", Website, 2016, pp. 1-5, Retrieved From the Internet: <https://fas.org/>, on Dec. 9, 2016.

* cited by examiner

*Primary Examiner* — Philip Sobutka
(74) *Attorney, Agent, or Firm* — Pepper Hamilton LLP (57) ABSTRACT

A method and system for managing Wireless Avionics Intra-Communication Systems (WAICSs) in a Radio Altimeter (RA) band is disclosed. The method includes allocating, by a communication management device, a plurality of RA sub-bands within the RA band to a plurality of WAICS transmitters, wherein each of the plurality of WAICS transmitters is allocated at least one of the plurality of RA sub-bands; detecting, by the communication management device, overlap of an RA signal with at least one RA sub-band from the plurality of RA sub-bands; and switching off, iteratively by the communication management device, at least one of the plurality of WAICS transmitters whose allocated RA-sub-band overlaps with at least a part of the RA signal.

12 Claims, 6 Drawing Sheets

ALLOCATION OF RADIO ALTIMETER (RA) SUB-BANDS TO WIRELESS AVIONICS INTRA-COMMUNICATION SYSTEMS

This application claims the benefit of Indian Patent Application Serial No. 201641037175 filed Oct. 28, 2016, which is hereby incorporated by reference in its entirety.

FIELD

This disclosure relates generally to Wireless Avionics Intra-Communication Systems (WAICSs) and more particularly to methods and systems for managing WAICSs in a Radio Altimeter (RA) band.

BACKGROUND

Communication among entities within the boundary of an aircraft were historically managed through wired communication. However, wired communication infrastructure running across the length and breadth of the aircraft significantly add to weight of the aircraft. This has an adverse impact on fuel efficiency of the aircraft and its load carrying capacity. Moreover, wired communication means are more prone to damage due to wear and tear and sabotage by rodents.

Wireless communication may be used to solve the above mentioned issues of wired communication. However, for use of wireless communication in an aircraft, only available option currently is Radio Altimeter spectrum (which is 200 MHz band from 4.2 to 4.4 GHz). Even when bandwidth in this RA spectrum is available, using the RA spectrum may not be a feasible option when the aircraft is travelling cross-country.

Some convention systems use Wireless Avionics Intra-Communication (WAIC) systems to provide highly reliable short-range radio communication links between two or more aircraft systems or sub-systems on-board the same aircraft. This wireless transmission technology is used for safety-related machine-to-machine communication on-board an aircraft resulting in lower production, maintenance and operational costs. However, WAICS are prone to interference with the RA signal under simultaneous operational conditional while sharing the spectrum. Such interference has a negative impact on overall aircraft operations and safety factors. Moreover, since the RA signal is always on during the course of take-off, landing and during flight, there is a need for a mechanism to control operations of WAICS in such a way that minimizes interference during the complete course of flight.

SUMMARY

In one embodiment, a method of managing Wireless Avionics Intra-Communication Systems (WAICSs) in a Radio Altimeter (RA) band is disclosed. The method includes allocating, by a communication management device, a plurality of RA sub-bands within the RA band to a plurality of WAICS transmitters, wherein each of the plurality of WAICS transmitters is allocated at least one of the plurality of RA sub-bands; detecting, by the communication management device, overlap of an RA signal with at least one RA sub-band from the plurality of RA sub-bands; and switching off, iteratively by the communication management device, at least one of the plurality of WAICS transmitters whose allocated RA-sub-band overlaps with at least a part of the RA signal.

In another embodiment, a communication management device for managing WAICS in a RA is disclosed. The communication management device includes at least one processors; and a memory communicatively coupled to the processor, wherein the memory stores processor instructions, which, on execution, causes the processor to: allocate a plurality of RA sub-bands within the RA band to a plurality of WAICS transmitters, wherein each of the plurality of WAICS transmitters is allocated at least one of the plurality of RA sub-bands; detect overlap of an RA signal with an RA sub-band from the plurality of RA sub-bands; and switch off, iteratively, at least one of the plurality of WAICS transmitters whose allocated RA-sub-band overlaps with at least a part of the RA signal.

In yet another embodiment, a non-transitory computer-readable storage medium is disclosed, the non-transitory computer-readable storage medium having stored thereon, a set of computer-executable instructions for managing WAICSs in a RA band, causing a computer comprising one or more processors is to perform steps comprising: allocating a plurality of RA sub-bands within the RA band to a plurality of WAICS transmitters, wherein each of the plurality of WAICS transmitters is allocated at least one of the plurality of RA sub-bands; detecting overlap of an RA signal with an RA sub-band from the plurality of RA sub-bands; and iteratively switching off, at least one of the plurality of WAICS transmitters whose allocated RA-sub-band overlaps with at least a part of the RA signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
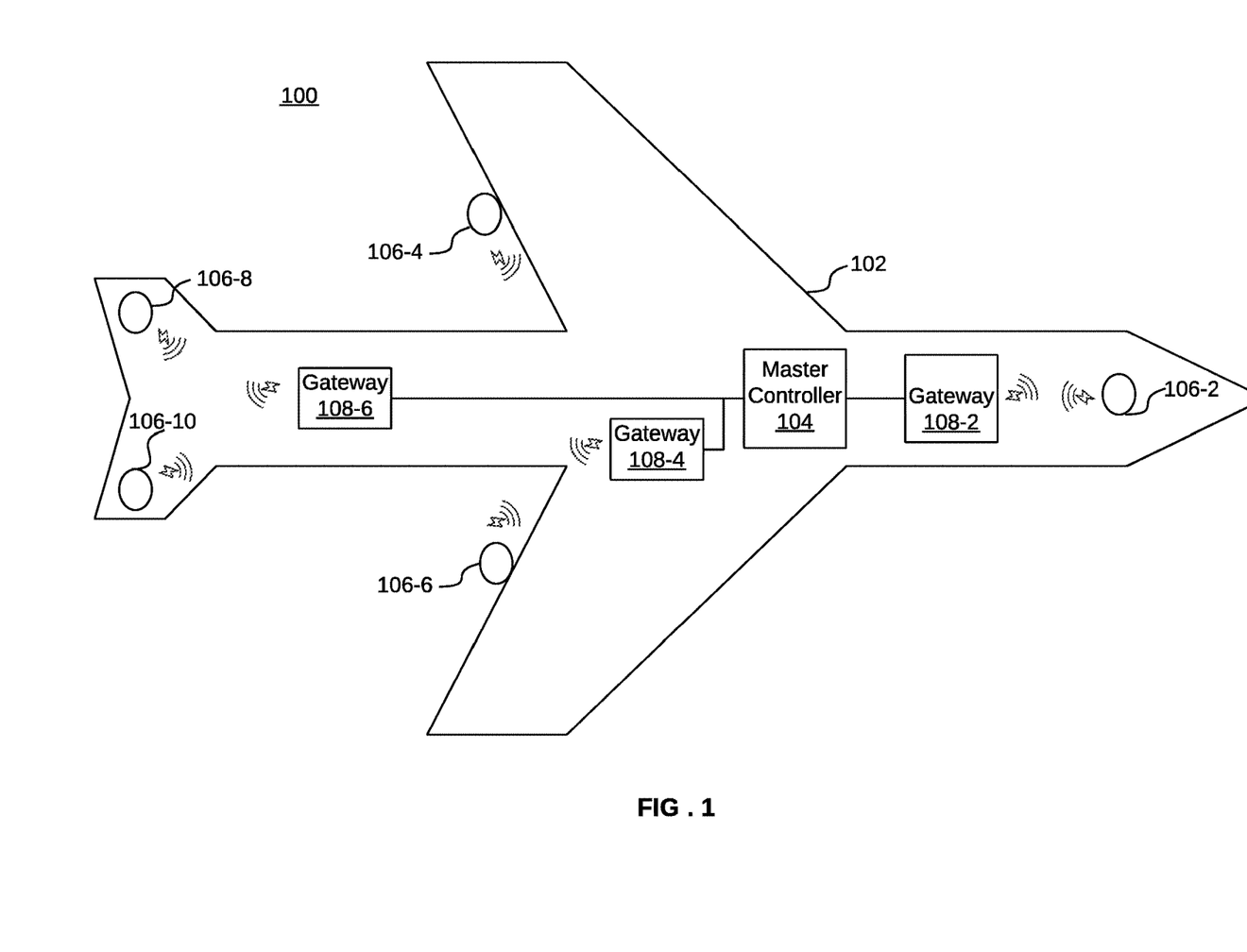
FIG. 1 is a diagram illustrating an exemplary Wireless Avionics Intra-Communication System (WAICS) within an aircraft in which various embodiment may function.

Additional illustrative embodiments are listed below. In one embodiment, an exemplary Wireless Avionics Intra-Communication System (WAICS) 100 within an aircraft 102 is illustrated in FIG. 1, in which various embodiment may function. WAICS 100 includes a master controller 104 and sensors 106 that are placed at various locations within and outside the structure of aircraft 102. Sensor 106-2, sensor 106-8, and sensor 106-10 are placed within the structure of aircraft 102, while sensor 106-4 and sensor 106-6 are placed outside the structure of aircraft 102. Sensors placed outside the structure of aircraft 102 gather data related to one or more of, but not limited to landing gears, aircraft fuselage, structural health, temperature, pressure, humidity, corrosion, proximity, wheel speed for anti-skid control, wheel position for steering control, engine parameter for engine monitoring and control, ice detection, tire pressure, tire and brake temperature, hard landing detection, cargo compartment data, and external imaging.

Sensors placed within aircraft 102 gather data related to one or more of, but not limited to cabin pressure, smoke, door position, monitoring of objects related to safety of passengers and crew (for example, life vests and fire extinguishers), fuel tank, passenger and cargo doors, panels, valves and other mechanical moving parts, ECS, EMI detection sensors, emergency lighting control, aircraft lighting control, air data, flight deck and cabin crew voice, flight deck and cabin crew still imagery, flight deck and cabin crew motion video, flight operations related digital data.

Each of sensors 106 is connected to a transmit antenna (not shown in FIG. 1) to wirelessly transmit data collected by sensors 106 to an associated gateway 108 in aircraft 102. Aircraft 102 is divided into multiple compartments that may include, but are not limited to flight deck, cabin compartment, Auxiliary Power Unit (APU) compartment; avionics compartment, forward cargo compartment, bilge, nacelles, centre tank, wing fuel tanks, vertical and horizontal stabilizers, main landing gear wheel wells, nose landing gear wheel wells, slats and flaps stowage compartments.

Based on size of a particular compartment, one or more gateways 108 may be placed in that compartment. Sensors 106 placed within a particular compartment transmit the gathered data to a gateway assigned to that compartment. By way of an example, sensor 106-2 placed in the flight deck compartment transmits gathered data to gateway 108-2, sensor 106-4 and sensor 106-6 placed in the wing fuel tanks transmit gathered data to gateway 108-4, and sensor 106-8 and sensor 106-10 placed in the vertical and horizontal stabilizers transmit gathered data to a gateway 108-6.

Gateways 108 are communicatively coupled (through wired or wireless means) to master controller 104 and forward the data gathered from associated sensors 106 to master controller 104. Data received by master controller 104 is used to perform predefined analysis and result of this analysis may be used by master controller 104 to send control signal to other controllers (not shown in FIG. 1) and actuators (not shown in FIG. 1) through associated gateways 108. These control signal are sent to perform a desired function or a corrective measure. By way of an example, when cabin pressure drop is detected by a sensor, master controller 104 instructs an actuator to dispense oxygen masks. By way of another example, master controller activates warning lights in the cock-pit, when a risk to aircraft 102 is detected by one of sensors 106.

Figure 2:
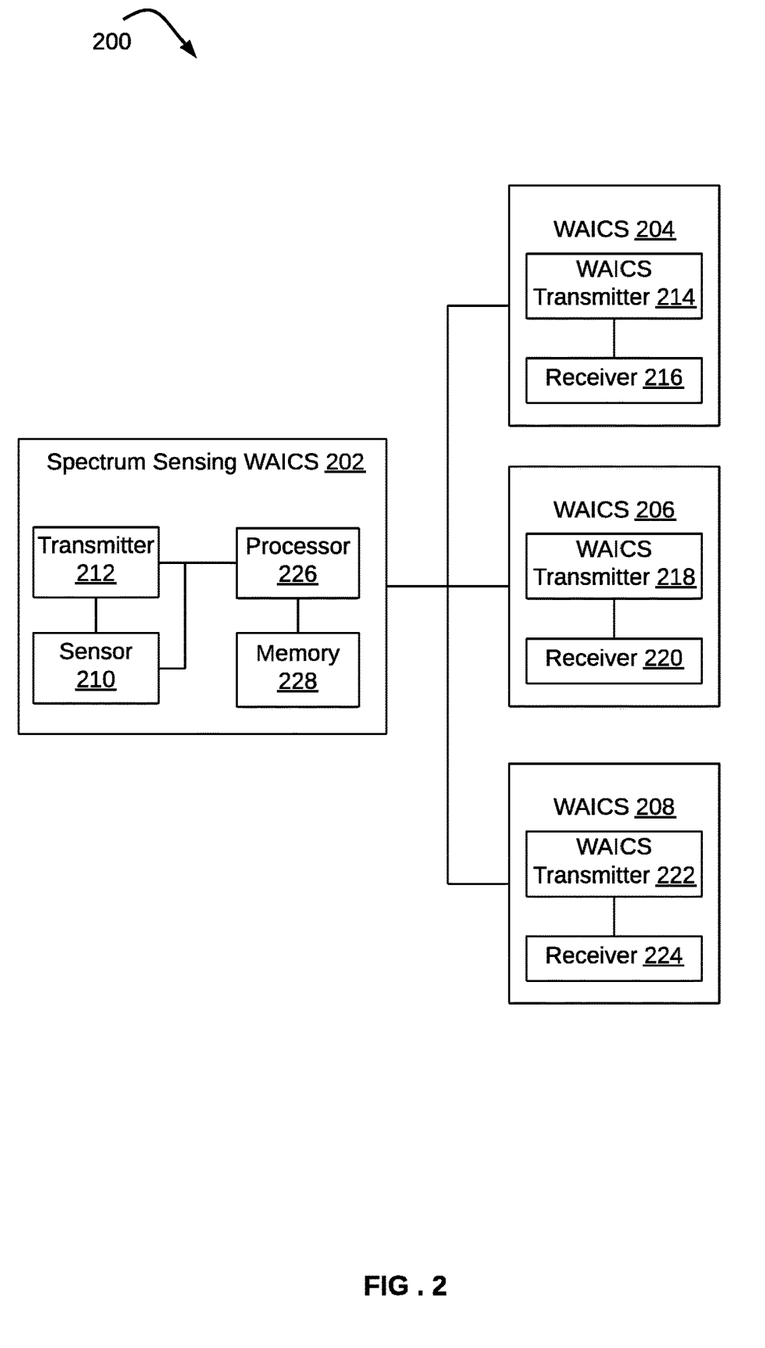
FIG. 2 is a block diagram illustrating a system for managing WAICSs in a Radio Altimeter (RA) band, in accordance with an embodiment.

Referring now to FIG. 2, a block diagram of a system 200 for managing WAICS in a Radio Altimeter (RA) band is illustrated, in accordance with an embodiment. System 200 is part of a communication management device that manages WAICS communication in the RA band. The communication management device may be placed within aircraft 102. In an embodiment, system 200 may be a distributed system, such that, various components of system 200 are placed at different location within aircraft 102.

System 200 includes a spectrum sensing WAICS 202 that is wirelessly connected with each of WAICS 204, WAICS 206, and WAICS 208. Spectrum sensing WAICS 202 detects presence of an RA signal and communicates this information regarding detection of the RA signal to each of WAICS 204, WAICS 206, and WAICS 208 for managing WAICS communication in the RA Band. It will be apparent to a person skilled in the art that system 200 may include more than three WAICSs.

Spectrum sensing WAICS 202 includes a sensor 210 and a transmitter 212. The connector between sensor 210 and transmitter 212 may be a software connector and the examples in this case may include, but are not limited to TCP/IP sockets, shared variables, and global variables. The connector may be a hardware connector and the examples in this case may include, but are not limited to a hardware triggered interrupt. In an embodiment, system 200 may include more than one spectrum sensing WAICS.

Each of WAICS 204, WAICS 206, and WAICS 208 include a WAICS transmitter and a receiver. WAICS 204 includes a WAICS transmitter 214 and a receiver 216, WAICS 206 includes a WAICS transmitter 218 and a receiver 220, and WAICS 208 includes a WAICS transmitter 222 and a receiver 224. The connector between a WAICS transmitter and a receiver of a WAICS is similar to connector between sensor 201 and transmitter 212. Thus, examples of the connector, in case of a software connector, may include, but are not limited to TCP/IP sockets, shared variables, and global variables. In case of a hardware connector, examples may include, but are not limited to a hardware triggered interrupt.

Transmitter 212 in spectrum sensing WAICS 202 is communicatively coupled to each of receiver 216, receiver 220, receiver 224 through an air interface. Examples of protocols for the air interface may include, but are not limited to Gaussian Minimum Shift Keying (GMSK), Quadrature Phase Shift Keying (QPSK), and Orthogonal Frequency Division Multiplexing (OFDM).

Spectrum sensing WAICS 202 further includes a processor 226 that allocates a plurality of RA sub-bands within the RA band to each of WAICS transmitter 214, WAICS transmitter 218, and WAICS transmitter 222. The plurality of sub-bands are allocated, such that, each of WAICS transmitter 214, WAICS 218, and WAICS transmitter 222 is allocated one or more RA sub-bands. Processor 226 may store such historic allocations of RA sub-bands in a memory 212 and may use it for future allocation of RA sub-bands.

Processor 226 also selects one or more guard bands from the plurality of RA sub-bands. A guard band is selected, such that, it is situated between adjacent RA sub-bands allocated to two WAICS transmitters. This is further explained in detail in conjunction with the exemplary embodiment given in FIG. 5. In an embodiment, processor 226 and memory 228 may be located outside spectrum sensing WAICS 202 and may directly communicate with each of WAICS 204, WAICS 206, and WAICS 208.

Processor 226 further allocates a spectrum sensing RA sub-band from the plurality of RA sub-bands to sensor 210. In an embodiment, when system 200 includes multiple spectrum sensing WAICSs, equal number of spectrum sensing RA sub-bands may be allocated to sensors in these spectrum sensing WAICSs. The spectrum sensing RA sub-band is used for spectrum sensing in order to detect the RA signal. Sensor 210 continuously samples the RA band at the spectrum sensing RA sub-band and communicates with processor 226 to estimate the average power in the spectrum sensing RA sub-band. The RA signal is detected by sensor 210 at the center of the spectrum sensing RA sub-band. When sensor 210 detects the RA signal, it communicates this information to transmitter 212, via, processor 226.

Transmitter 212 encodes the information related to detection of the RA signal received from sensor 210 and transmits it to one or more of receiver 216, receiver 220, and receiver 224 on a control RA sub-band. The control RA sub-band is selected from the RA band by processor 226 and is allocated by it to each of transmitter 212, receiver 216, receiver 220, and receiver 224.

Each receiver continuously listens at the control RA sub-band for transmissions from transmitter 212. When a receiver in a WAICS receives information from transmitter 212, it instructs an associated WAICS transmitter to 'switch on' or 'switch off' based on the information received. By way of an example, receiver 216 sends instructions to WAICS transmitter 214, receiver 220 send instructions to WAICS transmitter 218, and receiver 224 sends instructions to WAICS transmitter 222, based on the information received from transmitter 212. In other words, a receiver in a WAICS controls functioning of an associated WAICS transmitter. The associated WAICS transmitter accordingly transmits data, such that, the transmission does not interfere with the RA signal. This is further explained in detail in conjunction with FIGS. 3, 4, and 5. The type of data transmitted by each of WAICS transmitter 214, WAICS transmitter 218, and WAICS transmitter 222, may include but is not limited to aircraft cabin and on-board parameters, for example, ambient temperature, ambient pressure, temperature and pressure of safety-critical components, and fuel-level. This has been explained in detail in conjunction with FIG. 1.

Figure 3:
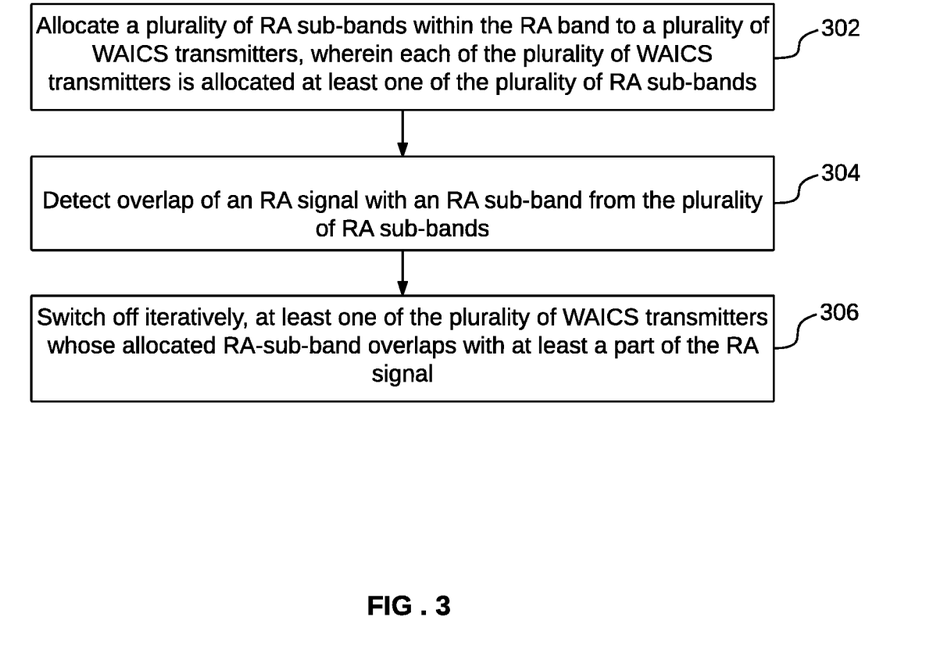
FIG. 3 illustrates a flowchart of a method for managing WAICSs in a RA band, in accordance with an embodiment.

Referring now to FIG. 3, a flowchart of a method for managing WAICSs in a RA band, in accordance with an embodiment. At 302, a communication management device that includes system 200 allocates a plurality of RA sub-bands within the RA band to a plurality of WAICS transmitters. The plurality of RA sub-bands are allocated, such that, each WAICS transmitters is allocated one or more RA sub-bands. By way of an example, an RA sub-band is allocated to each of WAICS transmitter 214, WAICS transmitter 218, and WAICS transmitter 222. The communication management device additionally selects one or more guard bands from the plurality of sub-bands. A guard band is selected, such that, it is located between two adjacent RA sub-bands. In other words, a guard band is sandwiched between two RA sub-bands to mitigate interference between the two RA sub-bands. This is further explained in detail in conjunction with exemplary embodiment given in FIG. 5.

The communication management device also allocates a spectrum sensing RA sub-band from the plurality of RA sub-bands for spectrum sensing. In an embodiment, more than one spectrum sensing RA sub-band may be allocated. The spectrum sensing RA sub-band is allocated to sensor 210. The spectrum sensing RA sub-band is used to detect an RA signal sweeping the RA band. In an embodiment, the center of the spectrum sensing RA sub-band is used to detect the RA signal. A control RA sub-band is also allocated by the communication management device to transmitter 212, receiver 216, receiver 220, and receiver 224. Transmitter 212 uses the control RA sub-band to send control signals to each of receiver 216, receiver 220, and receiver 224. The control signals include information related to detection of the RA signal by sensor 210.

After allocating various RA sub-bands, the communication management device, at 304, may detect overlap of the RA signal with one or more RA sub-bands that were allocated to WAICS transmitters 214, 218, and 222. To detect an RA signal overlap, when the RA signal is sweeping the RA band, sensor 210 detects the RA signal at the central frequency of the spectrum sensing RA sub-band. Processor 226 in communication with sensor 210, determines the signal power at the center of the spectrum sensing RA sub-band. Processor 226 makes a predefined number of such determinations or measurements. In an embodiment, when system 200 includes multiple spectrum sensing WAICS 202's, multiple such sensors (similar to sensor 210) detect the RA signal at different time instants on the RA band. These multiple detection of the RA signals at different time instants and different spectrum sensing RA sub-bands may help increasing efficiency of the system in managing WAICSs in the RA band.

In an exemplary embodiment, once sensor 210 detects the RA signal, processor 226 in communication with sensor 210 may perform the following steps:

Calculate a ratio using equation 1 given below:

$$\text{Ratio} = (\text{Sum of signal power measurements})/(\text{Number of signal power measurements}) \quad (1)$$

If Ratio>a predefined ratio threshold,
  RA signal Detection Decision=1 (In other words, RA signal is detected by sensor 210)
If Ratio<=a predefined ratio threshold,
  RA signal Detection Decision=0 (In other words, RA signal is not detected sensor 210)
  where,
    the predefined ratio threshold may be calculated using techniques that may include, but are not limited to maximum likelihood and Receiver Operating Characteristics (ROC).

Thereafter, processor 226 in communication with sensor 210 determines sweep duration of the RA signal. Referring back to the exemplary embodiment discussed above, when RA Detection Decision=1, processor 226 may perform the following steps to determine the sweep duration of the RA signal:

If Tactual=0,
  TSB=Tmax/NSB,
Else,
  TSB=Tactual/NSB,
If TSB<Tmin/NSB,
  TSB=0,
Else if TSB>Tmax/NSB,
  TSB=Tmax/NSB,
  where,
    TSB is the time taken by the RA signal to sweep over one RA sub-band,
    Tmax is the maximum sweep duration of the RA signal in seconds,
    Tmin is the minimum sweep duration of the RA signal in seconds,
    NSB is the total number of RA sub-bands in the RA Band,
    Tactual is the actual sweep duration of the RA signal in seconds and is initially set at 0.
If TSB≠0 communicate the time instant of detecting the RA signal and the value of TSB to transmitter 212

Once transmitter 212 has received the time instant of detecting the RA signal and the value of TSB, transmitter 212 performs the following steps, in continuation of the exemplary embodiment above:

Convert every digit in 'the time instant of detecting the RA signal' to a character and create a string of characters: String 1.

Append a pre-defined character to the String 1.

Convert every digit in TSB to a character and create a second string of characters: String 2.

Append String 2 to String 1 to create String 12.

Convert every character in String 12 to ASCII equivalent and create Bit Sequence 12.

Transmitter 212 then applies a pre-defined modulation protocol on the Bit Sequence 12. Examples of the pre-defined modulation protocol may include, but are not limited to GMSK, QPSK, and OFDM. Post modulation, transmitter 212 transmits the Bit Sequence 12 using the control RA Sub-band to each of receiver 216, receiver 220, and receiver 224.

After receiving transmission from transmitter 212, each of receiver 216, receiver 220, and receiver 224 apply a pre-defined de-modulation protocol to the transmissions to obtain the Bit Sequence 12 and determines the time instant of reception of Bit Sequence 12. In continuation of the exemplary embodiment given above, each of receiver 216, receiver 220, and receiver 224 performs the following steps:

Convert all bit sequences in Bit Sequence 12 to equivalent characters using reverse ASCII encoding to obtain String 12.

Search for the pre-defined character in String 12, remove it from String 12, and split String 12 into String 1 and String 2.

Convert the characters in String 1 into a sequence of digits to obtain 'Time instant of detecting the RA signal'.

Convert the characters in String 2 into a sequence of digits to obtain TSB.

Thereafter, at 306, the communication management device, iteratively switches off one or more of the plurality of WAICS transmitters whose allocated RA-sub-band overlaps with one or more parts of the RA signal. In other words, any WAICS transmitter whose allocated RA sub-band overlaps with the RA signal, wholly or partially, is switched off. This is repeated for each WAICS transmitter in system 200. The time duration for which a particular WAICS transmitter should be switched off is determined based on 'the time instant of detecting the RA signal' and the sweep duration of the RA signal (TSB). In continuation of the exemplary embodiment above, each of receiver 216, receiver 220, and receiver 224, perform the following steps:

Compute $\delta$ using equation 2 given below $$\delta = \text{(Time instant of reception of the Bit Sequence 12 − Time instant of detecting the RA signal)} * (BWSB/TSB) \quad (2)$$

If $\delta \geq BWSB/2$, then
$N = Ni-1$, and
Time to Arrival of the RA signal $= [N+(1.5-\delta/BWSB)] * TSB$,
Else if $\delta < BWSB/2$, then
$N = Ni$, and
Time to Arrival of the RA signal $= [N+(0.5-\delta/BWSB)] * TSB$,
where,
BWSB is bandwidth in Hz of an RA sub-Band, Ni is the total number of RA sub-bands between the spectrum sensing sub-band and first RA sub-Band of the ith WAICS transmitter In continuation of the exemplary embodiment above, each of receiver 216, receiver 220, and receiver 224 sets a timer that expires in 'Time to arrival of the RA signal' seconds by performing the following steps:

Set Timer Expiry=0

Set a memory counter to 'Time to arrival of the RA signal'

At every time instant, decrement the memory counter by one unit of time.

When memory counter=0, Timer Expiry=1

If Timer Expiry=1 for a receiver, the receiver instructs the associated WAICS transmitter to 'switch off.' By way of an example, if Timer Expiry=1 for receiver 216, receiver 216 instructs WAICS transmitter 214 to 'switch off' as the RA signal is overlapping (partial or wholly) with RA sub-band allocated to WAICS transmitter 214.

A WAICS transmitter that had been switched off due to overlap (partially or wholly) of the RA signal with the RA sub-band allocated to the WAICS transmitter is later switched on. The WAICS transmitter is switched on when each part of the RA signal has swept the RA sub-band allocated to the WAICS transmitter. In other word, when the RA signal has completely swept that RA sub-band. In continuation of the exemplary embodiment given above, a receiver whose associated WAICS transmitter was 'switched off,' performs the following steps before instructing the associated WAICS transmitter to 'switch on':

Calculate 'Off Time' using equation 3 given below:

$$\text{Off Time} = (BWi/BWSB) * TSB \quad (3)$$

where,
BWi is the bandwidth in Hz of the RA sub-band allocated to $i_{th}$ WAICS transmitter
The receiver sets a timer that expires in 'Off Time' seconds by performing the following steps:
Timer Expiry=0
Set a memory counter to 'Off Time'
At every time instant, decrement the memory counter by one unit of time.
When memory counter=0, Timer Expiry=1
When Timer Expiry=1, the receiver instructs the associated WAICS transmitter to 'switch on'

The above discussed method and system architecture is not specific to any particular application and, hence, can be utilized for any kind of wireless communication system on-board an aircraft. The 'off time' that is computed for switching off a WAICS transmitter is a fraction of the overall RA sweep period, thus resulting in an efficient and optimum use of the RA band. Moreover, the system is robust enough to adapt to any change in the sweep rate of the RA signal. As a dedicated sub-band in the RA band is used for spectrum sensing, the method ensures a minimum spectrum sensing overhead.

Figure 4:
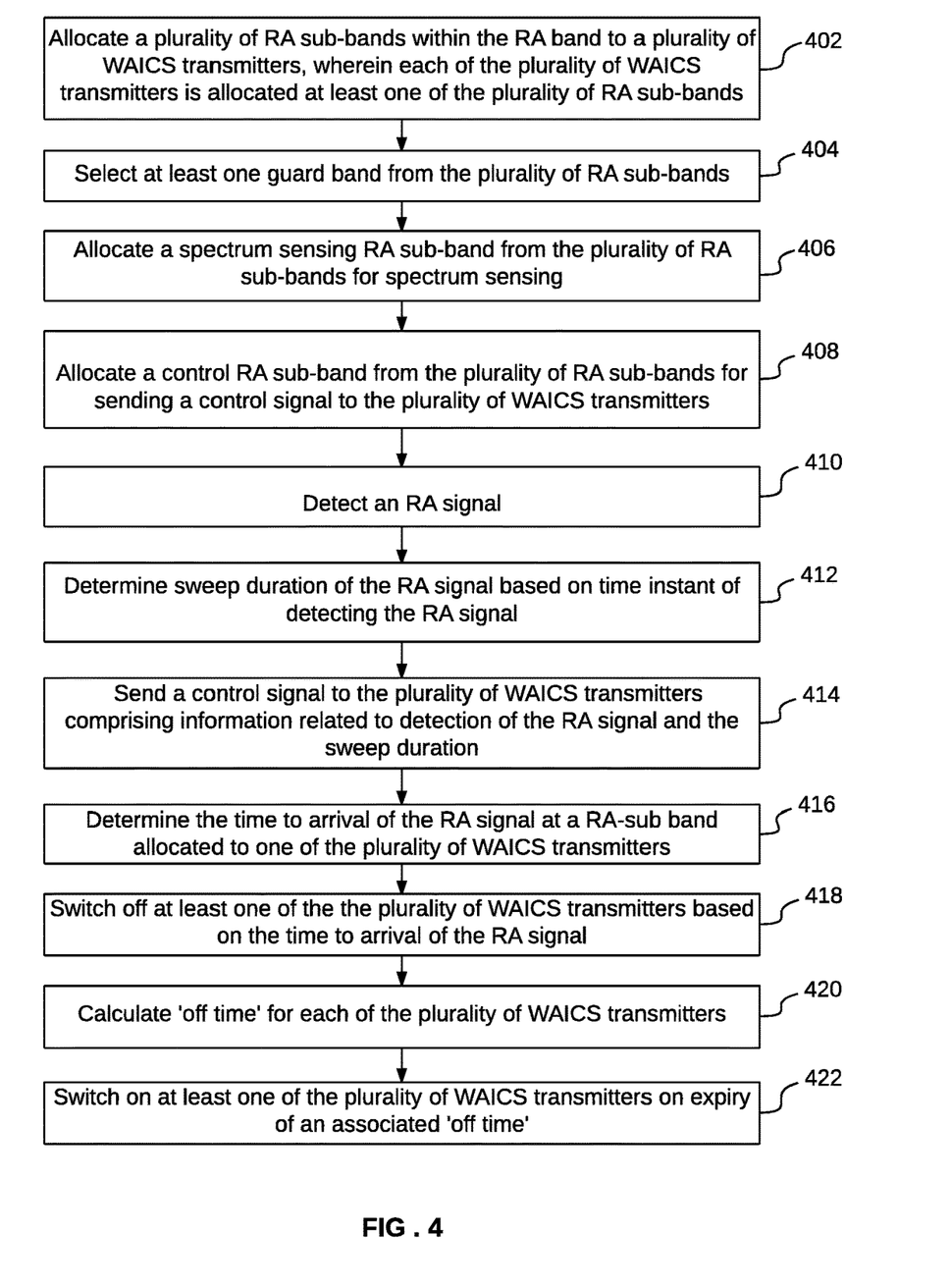
FIG. 4 illustrates a flowchart of a method for managing WAICSs in a RA band, in accordance with another embodiment.

Referring now to FIG. 4, a method for managing WAICSs in a RA band is illustrated, in accordance with another embodiment. At 402, a plurality of RA sub-bands within the RA band are allocated to a plurality of WAICS transmitters. Thereafter, at 404, one or more guard bands are selected from the plurality of RA sub-bands, such that, one guard band is situated between adjacent RA sub-bands allocated to WAICS transmitters. At 406, a spectrum sensing RA sub-band from the plurality of RA sub-bands is allocated for spectrum sensing. The spectrum sensing RA sub-band being used to detect a RA signal. Thereafter, at 408, a control RA sub-band from the plurality of RA sub-bands is allocated for sending a control signal to a plurality of receivers associated with the plurality of transmitters. This has been explained in detail in conjunction with FIG. 3. It will be apparent to a person skilled in the art that the sequence of execution of 402 to 408 may be different. It will be further apparent to a person skilled in the art that 402 to 408 may be executed in a single step.

At 410, sensor 210 detects the RA signal at the central frequency of the spectrum sensing RA sub-band. This information is shared with processor 226, which determines the time instant of detecting the RA signal. Processor 226, at 412, determines sweep duration of the RA signal based on the time instant of detecting the RA signal. The associated computations have been explained in detail in conjunction with FIG. 3. Processor 226 then shares the time instant of detecting the RA signal and the sweep duration of the RA signal with transmitter 212.

Transmitter 212 sends a control signal to the plurality of receivers associated with the plurality of WAICS transmitters at 414. The control signal includes information related to the time instant of detecting the RA signal and the sweep duration of the RA signal. At 416, each of the plurality of receivers determine the time to arrival of the RA signal at an RA sub-band allocated to an associated WAICS transmitter. The time to arrival of the RA signal is determined using the time instant of detecting the RA signal and the sweep duration of the RA signal. This has been explained in detail in conjunction with FIG. 3.

Thereafter, at 418, each of the plurality of receivers instructs associated WAICS transmitters to 'switch off' based on the time to arrival of the RA signal. At 420, each of the plurality of receivers calculate an off time for an associated WAICS transmitter. The calculation of 'off time' has been explained in detail in conjunction with FIG. 3. After expiry of an associated 'off time,' each of the plurality of receivers instruct associated WAICS transmitters to "switch on' at 422. This has been explained in detail in conjunction with FIG. 3.

Figure 5:
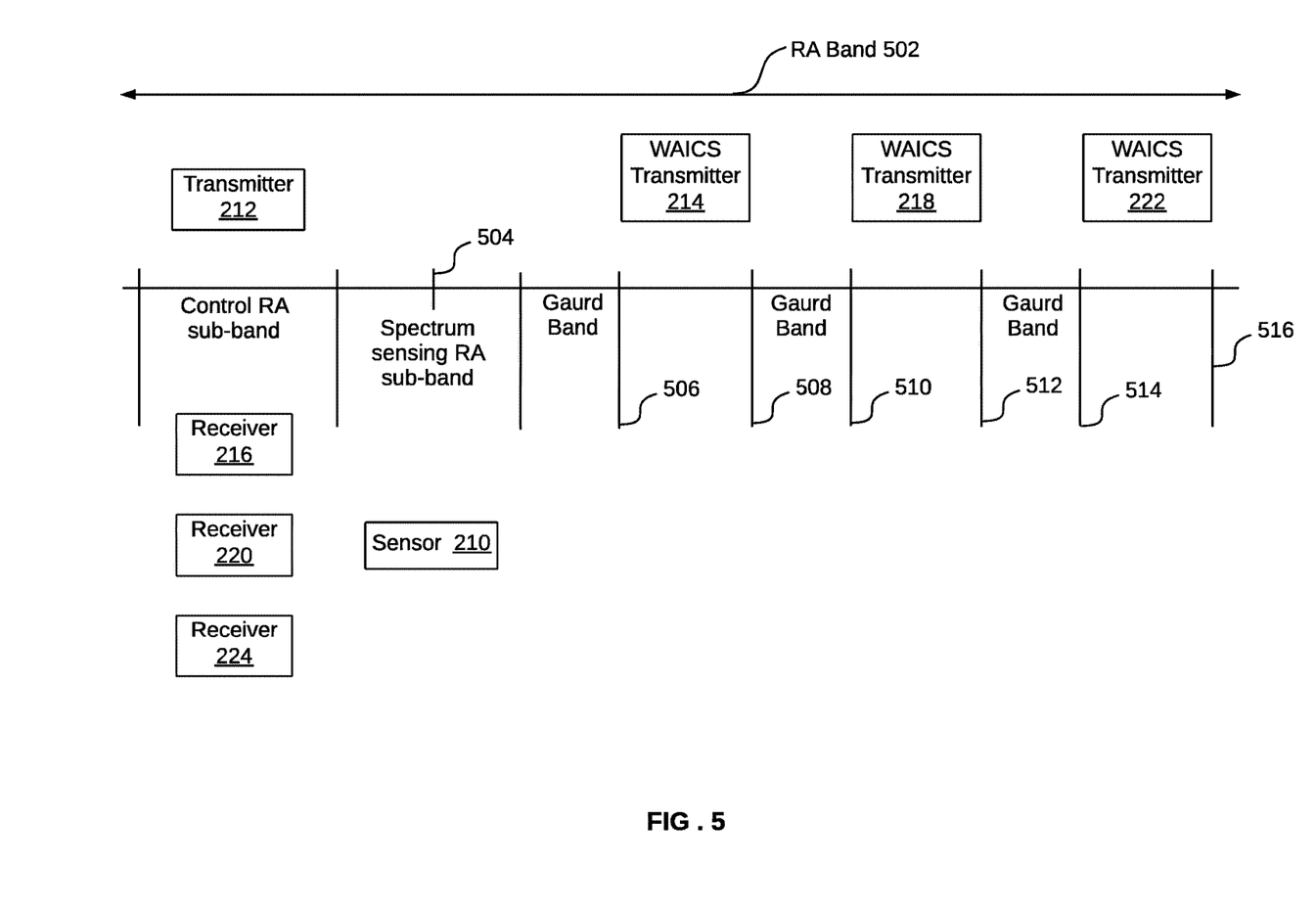
FIG. 5 illustrates allocation of RA sub-bands from an RA band to WAICS transmitters for facilitating management of WAICS in the RA band is illustrated, in accordance with an exemplary embodiment.

Referring now to FIG. 5, allocation of RA sub-bands from an RA band 502 to WAICS transmitters for facilitating management of WAICS in RA band 502 is illustrated, in accordance with an exemplary embodiment. Sub-bands within RA band 502 are allocated to various components of system 200. As discussed in FIG. 2, one RA sub-band from RA band 502 is allocated to each of WAICS transmitter 214, WAICS transmitter 218, and WAICS transmitter 222, such that, WAICS transmitters transmit data in their respective RA sub-bands within aircraft 102. Guard bands are also allocated between RA sub-bands of WAICS transmitters to mitigate interference between WAICS transmitter 214 and WAICS transmitter 218 and between WAICS transmitter 218 and WAICS transmitter 222.

Further, for detecting the RA signal, a spectrum sensing RA sub-band from RA band 502 is allocated to sensor 210. A guard band is allocated between the spectrum sensing RA sub-band and the RA sub-band of WAICS transmitter 214. This guard band mitigates interference between transmission from WAICS transmitter 214 and the RA signal. This ensures that sensor 210 accurately detects the RA signal. Moreover, as sensor 210 detects the RA signal at 504, which is the central frequency of the spectrum sensing RA sub-band, detection of the RA signal without interference is further ensured.

To communicate the information regarding detection of the RA signal, a control RA sub-band from RA band 502 is allocated to transmitter 212, receiver 216, receiver 220, and receiver 224. The control RA sub-band is used by transmitter 212 to communicate information regarding 'the time instant of detecting the RA signal' and 'sweep duration of the RA signal' to each of receiver 216, receiver 220, and receiver 224 on the control RA sub-band. This has been explained in detail in conjunction with FIG. 3.

Based on the information received from transmitter 212, each of receiver 216, receiver 220, and receiver 224 determine 'time to arrival of the RA signal" at RA sub-bands allocated to their respective WAICS transmitters. 'The time to arrival of the RA signal' is used to determine when a receiver should instruct an associated WAICS transmitter to 'switch off' When the RA signal arrives at 506, receiver 216 instructs WAICS transmitter 214 to 'switch off' Similarly, WAICS transmitter 218 is instructed by receiver 220 to 'switch off' when the RA signal arrives at 510 and WAICS transmitter 222 is instructed by receiver 224 to 'switch off' when the RA signal arrives at 514. The RA signal is considered to have arrived, when the starting point of the RA signal overlaps with a given point on RA band 502.

Each of receiver 216, receiver 220, and receiver 224 also calculate an "off time," which is used by a receiver to determine when to 'switch on' their associated WAICS transmitters. The 'off time' for WAICS transmitter 214 is equal to the time taken by the RA signal to completely sweep the RA sub-band between points 506 and 508. The RA signal is said to completely sweep an RA sub-band, when, based on direction of sweep of the RA signal, the end point of the RA signal has crossed the end point of the RA sub-band. Thus, when a duration equal to 'off time" calculated for WAICS transmitter 214 has expired after WAICS transmitter 214 was 'switched off,' receiver 216 instructs WAICS transmitter 214 to 'switch on.' Similarly, the 'off time' for WAICS transmitter 218 is equal to the time taken by the RA signal to completely sweep the RA sub-band between points 510 and 512. The 'off time' for WAICS transmitter 222 is equal to the time taken by the RA signal to completely sweep the RA sub-band between points 514 and 516. In other words, WAICS transmitter 218 is 'switched off' when the RA signal arrives at 510 and is kept "switched off" until its 'off time' has expired, which is when the RA signal has completely swept 512. Similarly, WAICS transmitter 222 is 'switched off' when the RA signal arrives at 514 and is kept "switched off" until its 'off time' has expired, which is when the RA signal has completely swept 516.

Figure 6:
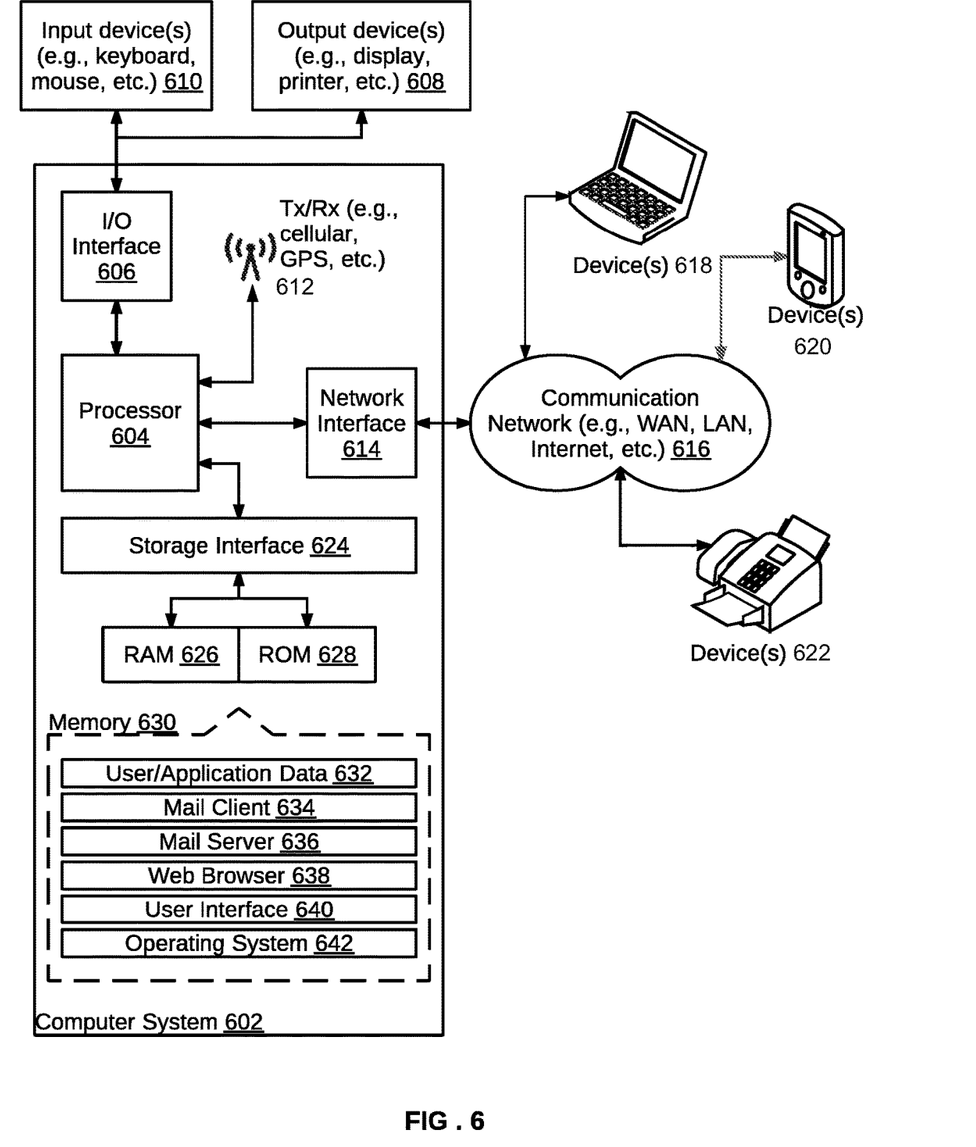
FIG. 6 illustrates a block diagram of an exemplary computer system for implementing various embodiment.

Referring now to FIG. 6, a block diagram of an exemplary computer system for implementing various embodiment is illustrated. Computer system 602 may comprise a central processing unit ("CPU" or "processor") 604. Processor 604 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory devices 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 630 may store a collection of program or database components, including, without limitation, an operating system 632, a user interface application 634, a web browser 636, a mail server 638, a mail client 640, a user/application data 642 (e.g., any data variables or data records discussed in this disclosure), etc. Operating system 632 may facilitate resource management and operation of the computer system 602. Examples of operating system 632 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 602 may implement web browser 636 stored program component. Web browser 636 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 602 may implement mail server 638 stored program component. Mail server 638 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement mail client 640 stored program component. Mail client 640 may be a mail viewing application, such as Apple Mail, Microsoft Entourage, Microsoft Outlook, Mozilla Thunderbird, etc.

In some embodiments, computer system 602 may store user/application data 642, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide methods and systems for managing WAICSs in an RA band. The system architecture is not specific to any particular application and, hence, can be utilized for any kind of wireless communication system on-board an aircraft. The 'off time' that is computed for switching off a WAICS transmitter is a fraction of the overall RA sweep period thus resulting in an efficient and optimum use of the RA band. Moreover, the system is robust enough to adapt to any change in the sweep rate of the RA signal. As a dedicated sub-band in the RA band is used for spectrum sensing, the method ensures a minimum spectrum sensing overhead.

The specification has described methods and systems for managing WAICSs in an RA band. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing Wireless Avionics Intra-Communication Systems (WAICSs) in a Radio Altimeter (RA) band to reduce interference, the method comprising:
   allocating, by a spectrum sensing WAICS, a plurality of RA sub-bands within an RA band to a plurality of WAICS transmitters, wherein each of the WAICS transmitters is allocated at least one of the RA sub-bands, wherein the spectrum sensing WAICS is wirelessly connected with each of the WAICS transmitters;
   determining, by the spectrum sensing WAICS, when an RA signal within the RA band at least partially overlaps with one of the plurality of RA sub-bands by continuously sampling the plurality of RA sub-bands within the RA band;
   allocating, by the spectrum sensing WAICS, a control RA sub-band selected from one of the RA sub-bands for sending a control signal to one or more of the WAICS transmitters whose allocated RA-sub-band overlaps with the RA signal, wherein the control signal comprises information related to a time instant of detecting the RA signal and a sweep duration of the RA signal;
   determining a time duration for switching off the one or more WAICS transmitters based on the information in the control signal; and
   switching off at least one of the one or more WAICS transmitters associated with the one of the RA-sub-bands based on the determined time duration, when the determination indicates that the RA signal at least partially overlaps with the one of the RA sub-bands.

2. The method of claim 1, further comprising:
   allocating a spectrum sensing RA sub-band to at least one of the RA sub-bands for spectrum sensing; and
   detecting the RA signal using the spectrum sensing RA sub-band one of the RA sub-bands.

3. The method of claim 2, wherein the RA signal is detected at a center of the spectrum sensing RA sub-band one of the RA sub-bands.

4. The method of claim 1, further comprising switching on the one of the WAICS transmitters when each part of the RA signal has swept the one of the RA sub-bands.

5. A system for managing a plurality of Wireless Avionics Intra-Communication Systems (WAICSs) in a Radio Altimeter (RA) band, the system comprising:
   a spectrum sensing WAICS wirelessly connected with each of a plurality of WAICS transmitters, the spectrum sensing WAICS comprising a memory comprising programmed instructions stored thereon and one or more processors configured to be capable of executing the stored programmed instructions to:
      allocate a plurality of RA sub-bands within the RA band to the plurality of WAICS transmitters, wherein each of the WAICS transmitters is allocated at least one of the RA sub-bands;
      determine when an RA signal within the RA band at least partially overlaps with one of the plurality of RA sub-bands by continuously sampling the plurality of RA sub-bands within the RA band;
      allocate a control RA sub-band selected from one of the RA sub-bands for sending a control signal to one or more of the WAICS transmitters whose allocated RA-sub-band overlaps with the RA signal, wherein the control signal comprises information related to a time instant of detecting the RA signal and a sweep duration of the RA signal; and
      switch off at least one of the one or more WAICS transmitters associated with the one of the RA-subbands based on the determined time duration, when the determination indicates that the RA signal at least partially overlaps with the one of the RA sub-bands, wherein the time duration for switching off the one of the WAICS transmitters is determined by the WAICS transmitter based on the information received in the control signal.

6. The system of claim 5, wherein the processors are further configured to be capable of executing the stored programmed instructions to:
   allocate a spectrum sensing RA sub-band one of the RA sub-bands for spectrum sensing; and
   detect the RA signal using the spectrum sensing RA sub-band one of the RA sub-bands.

7. The system of claim 6, wherein the RA signal is detected at a center of the spectrum sensing RA sub-band one of the RA sub-bands.

8. The system of claim 5, wherein the processors are further configured to be capable of executing the stored programmed instructions to switch on the one of the WAICS transmitters when each part of the RA signal has swept the one of the RA sub-bands.

9. A non-transitory computer readable medium having stored thereon instructions for managing Wireless Avionics Intra-Communication Systems (WAICSs) in a Radio Altimeter (RA) band to reduce interference that, when executed by one or more processors, cause the processors to:
   allocate, by a spectrum sensing WAICS, a plurality of RA sub-bands within the RA band to a plurality of WAICS transmitters, wherein each of the WAICS transmitters is allocated at least one of the RA sub-bands, wherein the spectrum sensing WAICS is wirelessly connected with each of the WAICS transmitters;
   determine by the spectrum sensing WAICS, when an RA signal within the RA band at least partially overlaps with one of the plurality of RA sub-bands by continuously sampling the plurality of RA sub-bands within the RA band;
   allocating, by the spectrum sensing WAICS, a control RA sub-band selected from one of the RA sub-bands for sending a control signal to one or more of the WAICS transmitters whose allocated RA-sub-band overlaps with the RA signal, wherein the control signal comprises information related to a time instant of detecting the RA signal and a sweep duration of the RA signal;
   determining a time duration for switching off the one or more WAICS transmitters based on the information in the control signal; and
   switch off at least one of the one or more WAICS transmitters associated with the one of the RA-sub-bands based on the determined time duration, when the determination indicates that the RA signal at least partially overlaps with the one of the RA sub-bands.

10. The non-transitory computer readable medium as claimed in claim 9, wherein the programmed instructions, when executed by the processors, further cause the processors to:
    allocate a spectrum sensing RA sub-band to at least one of the RA sub-bands for spectrum sensing; and
    detect the RA signal using the spectrum sensing RA sub-band one of the RA sub-bands.

11. The non-transitory computer readable medium as claimed in claim 10, wherein the RA signal is detected at a center of the spectrum sensing RA sub-band one of the RA sub-bands.

12. The non-transitory computer readable medium as claimed in claim 9, wherein the programmed instructions, when executed by the processors, further cause the processors to switch on the one of the WAICS transmitters when each part of the RA signal has swept the one of the RA sub-bands.

* * * * *